(12) United States Patent
Zeise et al.

(10) Patent No.: US 11,886,961 B2
(45) Date of Patent: Jan. 30, 2024

(54) PREPARING DATA FOR MACHINE LEARNING PROCESSING

(71) Applicant: SAP SE, Walldorf (DE)

(72) Inventors: Manuel Zeise, Karlsruhe (DE); Isil Pekel, Mannheim (DE); Steven Jaeger, Heidelberg (DE)

(73) Assignee: SAP SE, Walldorf (DE)

( * ) Notice: Subject to any disclaimer, the term of this patent is extended or adjusted under 35 U.S.C. 154(b) by 1162 days.

(21) Appl. No.: 16/582,950

(22) Filed: Sep. 25, 2019

(65) Prior Publication Data
US 2021/0089970 A1 Mar. 25, 2021

(51) Int. Cl.
| | |
|---|---|
| *G06N 20/00* | (2019.01) |
| *G06N 20/10* | (2019.01) |
| *G06N 3/04* | (2023.01) |
| *G06N 20/20* | (2019.01) |
| *G06F 18/214* | (2023.01) |
| *G06F 18/2413* | (2023.01) |
| *G06N 3/08* | (2023.01) |

(52) U.S. Cl.
CPC .......... *G06N 20/00* (2019.01); *G06F 18/214* (2023.01); *G06F 18/2414* (2023.01); *G06N 3/04* (2013.01); *G06N 3/08* (2013.01); *G06N 20/10* (2019.01); *G06N 20/20* (2019.01)

(58) Field of Classification Search
CPC ........ G06N 20/00; G06N 20/10; G06N 20/20; G06N 3/04; G06N 3/045; G06N 3/0464; G06N 3/08; G06F 18/2137; G06F 18/214; G06F 18/217; G06F 18/22; G06F 18/2414
See application file for complete search history.

(56) References Cited

U.S. PATENT DOCUMENTS

| | | | |
|---|---|---|---|
| 2015/0067556 A1* | 3/2015 | Tibrewal | G06F 16/26 715/765 |
| 2019/0138602 A1* | 5/2019 | Khov | G06Q 30/02 |
| 2019/0228318 A1* | 7/2019 | Kwant | G06N 3/045 |
| 2021/0027145 A1* | 1/2021 | Li | G06F 18/214 |
| 2022/0276056 A1* | 9/2022 | Banino | G01C 21/20 |

* cited by examiner

*Primary Examiner* — Shane D Woolwine
(74) *Attorney, Agent, or Firm* — Mintz Levin Cohn Ferris Glovsky and Popeo, P.C.

(57) ABSTRACT

Data for processing by a machine learning model may be prepared by encoding a first portion of the data including a spatial data. The spatial data may include a spatial coordinate including one or more values identifying a geographical location. The encoding of the first portion of the data may include mapping, to a cell in a grid system, the spatial coordinate such that the spatial coordinate is represented by an identifier of the cell instead of the one or more values. The data may be further prepared by embedding a second portion of the data including textual data, preparing a third portion of the data including hierarchical data, and/or preparing a fourth portion of the data including numerical data. The machine learning model may be applied to the prepared data in order to train, validate, test, and/or deploy the machine learning model to perform a cognitive task.

18 Claims, 11 Drawing Sheets

PREPARING DATA FOR MACHINE LEARNING PROCESSING

TECHNICAL FIELD

The subject matter described herein relates generally to machine learning and more specifically to preparing data for processing by a machine learning model.

BACKGROUND

Machine learning models may be trained to perform a variety of cognitive tasks including, for example, object identification, natural language processing, information retrieval, speech recognition, classification, regression, and/or the like. For example, an enterprise resource planning (ERP) system may include an issue tracking system configured to generate a ticket in response to an error reported via one or more telephone calls, emails, short messaging service (SMS) messages, social media posts, web chats, and/or the like. The issue tracking system may generate the ticket to include a textual description of the error associated with the ticket. As such, in order to determine a suitable response for addressing the error associated with the ticket, the enterprise resource planning system may include a machine learning model trained to perform text classification. For instance, the machine learning model may be trained to determine, based at least on the textual description of the error, a priority for the ticket corresponding to a severity of the error.

SUMMARY

Systems, methods, and articles of manufacture, including computer program products, are provided for preparing data for machine learning processing. In one aspect, there is provided a system including at least one data processor and at least one memory. The at least one memory may store instructions that cause operations when executed by the at least one data processor. The operations may include: preparing data for processing by a first machine learning model, the data being prepared by at least encoding a first portion of the data including a spatial data, the spatial data including a first spatial coordinate including one or more values identifying a geographical location, wherein the encoding of the first portion of the data includes mapping, to a first cell in a grid system, the first spatial coordinate such that the first spatial coordinate is represented by a first identifier of the first cell instead of the one or more values; and applying, to the prepared data, the first machine learning model.

In some variations, one or more features disclosed herein including the following features can optionally be included in any feasible combination. The encoding of the first portion of the data may further include mapping, to the first cell or a second cell in the grid system, a second spatial coordinate included in the spatial data.

In some variations, the first cell may be divided into a first sub-cell and a second sub-cell. The spatial data may be encoded by at least mapping the first spatial coordinate to the first sub-cell and a second spatial coordinate to the second sub-cell such that the first spatial coordinate is represented by a second identifier of the first sub-cell and the second spatial coordinate is represented by a third identifier of the second sub-cell. The first cell may be divided in response to more than a threshold quantity of spatial coordinates being mapped to the first cell.

In some variations, the data may be prepared for processing by the first machine learning model by at least embedding a second portion of the data including a textual data. The textual data may be embedded by at least applying a second machine learning model trained to embed the textual data. The first machine learning model may be a non-neural network based machine learning model including a linear model, a decision tree, an ensemble method, a support vector machine, and/or a Bayesian model. The second machine learning model may be a deep machine learning model including a deep neural network, a deep belief network, a recurrent neural network, and/or a convolutional neural network.

In some variations, the embedded textual data may be stored in a cache. A plurality of machine learning trials may be executed based on the embedded textual data. Each of the plurality of machine learning trials may be executed by at least retrieving, from the cache, the embedded textual data. Each of the plurality of machine learning trials may include a different machine learning model and/or a different set of trial parameters. The first machine learning model may be selected based at least on a result of the plurality of machine learning model.

In some variations, the data may be prepared for processing by the first machine learning model by at least preparing a second portion of the data including a hierarchical data. The hierarchical data may include a first column of data corresponding to a first level of a hierarchy and a second column of data corresponding to a second level of hierarchy. The preparing of the second portion of the data may include concatenating each value from the first column of data with a corresponding value from a second column of data. A first value from the first column of data may be concatenated with a second value from the second column of data and a third value from the first column of data may be concatenated with a fourth value from the second column of data in order to resolve an ambiguity associated with the first value being identical to the third value.

In some variations, the data may be prepared for processing by the first machine learning model by at least preparing a second portion of the data including a numerical data. The numerical data may include a plurality of quantities associated with different units of measurement and the second portion of the data may be prepared by at least converting the plurality of quantities to a same unit of measurement.

In some variations, the numerical data may include a plurality of zip codes and/or telephone numbers. The second portion of the data may be prepared by at least associating, based on one or more digits included in each of the plurality of zip codes and/or telephone numbers, each of the plurality of zip codes and/or telephone numbers with a corresponding geographic region.

In some variations, the first machine learning model may be applied to the prepared data in order to train, validate, test, and/or deploy the first machine learning model.

In some variations, the one or more values may include a longitudinal value and a latitudinal value.

In another aspect, there is provided a method for preparing data for machine learning processing. The method may include: preparing data for processing by a first machine learning model, the data being prepared by at least encoding a first portion of the data including a spatial data, the spatial data including a first spatial coordinate including one or more values identifying a geographical location, wherein the encoding of the first portion of the data includes mapping, to a first cell in a grid system, the first spatial coordinate such that the first spatial coordinate is represented by a first identifier of the first cell instead of the one or more values; and applying, to the prepared data, the first machine learning model.

In some variations, one or more features disclosed herein including the following features can optionally be included in any feasible combination. The method may further include: in response to more than a threshold quantity of spatial coordinates being mapped to the first cell, dividing, into a first sub-cell and a second sub-cell, the first cell; and; and encoding the spatial data by at least mapping the first spatial coordinate to the first sub-cell and a second spatial coordinate to the second sub-cell such that the first spatial coordinate is represented by a second identifier of the first sub-cell and the second spatial coordinate is represented by a third identifier of the second sub-cell.

In some variations, the method may further include preparing the data for processing by the first machine learning model by at least embedding a second portion of the data including a textual data. The textual data may be embedded by at least applying a second machine learning model trained to embed the textual data. The first machine learning model may be a non-neural network based machine learning model including a linear model, a decision tree, an ensemble method, a support vector machine, and/or a Bayesian model. The second machine learning model may be a deep machine learning model including a deep neural network, a deep belief network, a recurrent neural network, and/or a convolutional neural network.

In some variations, the method may further include preparing the data for processing by the first machine learning model by at least preparing a second portion of the data including a hierarchical data. The hierarchical data may include a first column of data corresponding to a first level of a hierarchy and a second column of data corresponding to a second level of hierarchy. The preparing of the second portion of the data may include concatenating each value from the first column of data with a corresponding value from a second column of data.

In another aspect, there is provided a computer program product that includes a non-transitory computer readable storage medium. The non-transitory computer-readable storage medium may include program code that causes operations when executed by at least one data processor. The operations may include: preparing data for processing by a first machine learning model, the data being prepared by at least encoding a first portion of the data including a spatial data, the spatial data including a first spatial coordinate including one or more values identifying a geographical location, wherein the encoding of the first portion of the data includes mapping, to a first cell in a grid system, the first spatial coordinate such that the first spatial coordinate is represented by a first identifier of the first cell instead of the one or more values; and applying, to the prepared data, the first machine learning model.

Implementations of the current subject matter can include methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to preparing data for machine learning processing, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1A:
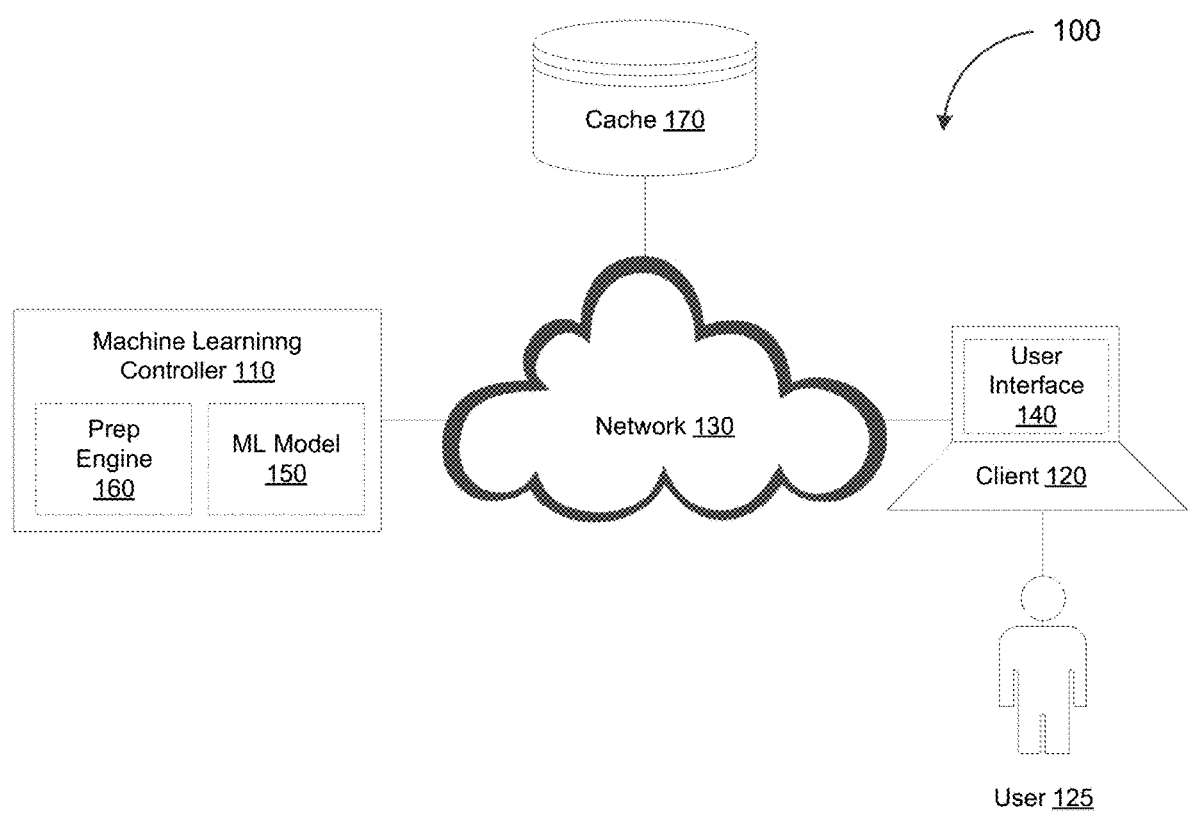
FIG. 1A depicts a system diagram illustrating an example of a machine learning system, in accordance with some example embodiments.

Although a machine learning model may be trained to perform a variety of cognitive tasks, the machine learning model may be capable of operating on numerical data but not textual data. Accordingly, prior processing by the machine learning model, one or more embedding techniques may be applied to textual data in order to transform the textual data into numerical data (e.g., numeric vectors). Conventional embedding techniques such as one-hot-encoding may be successfully applied to embed categorical data, which may be constrained to a limited set of values. By contrast, conventional embedding techniques for embedding unstructured textual data (e.g., term frequency-inverse document frequency (tf-idf) and/or the like) may fail to capture the context present in textual data and may thus diminish the accuracy of machine learning processing applied to the embedded textual data. Moreover, even numerical data may still require additional preparation in order to be processed by a machine learning model. As such, in some example embodiments, a machine learning controller may be configured to prepare numerical data and categorical data as well as textual data for processing by a machine learning model. For example, the machine learning controller may embed and/or encode data to at least optimize subsequent processing by the machine learning model.

In some example embodiments, the machine learning controller may apply a first machine learning model to embed data for processing by a second machine learning model. The first machine learning model may be a deep machine learning model based on artificial neural networks. Examples of the first machine learning model may include deep neural networks, deep belief networks, recurrent neural networks, and convolutional neural networks. By contrast, the second machine learning model may be a traditional machine learning model, which may be a non-neural network based machine learning model such as, for example, a linear model, a decision tree, an ensemble method, a support vector machine, and a Bayesian model. The results of applying a traditional machine learning model to textual data embedded by a deep machine learning model may be more robust and accurate because the deep machine learning model is able to preserve the context present in textual data. Accordingly, the combination of the deep machine learning model for embedding textual data and the traditional machine learning model for processing the embedded textual data may be especially optimal for machine learning applications that require consistently accurate results with minimal training and execution time.

In some example embodiments, the machine learning controller may prepare spatial data for processing by a machine learning model. Spatial data may include spatial coordinates, each of which including one or more values identifying a geographical location. The machine learning controller may therefore prepare the spatial data by at least encoding, based at least on a grid system, the spatial data. For example, the spatial data may be encoded by at least mapping each spatial coordinate (e.g. pair of longitudinal value and latitudinal value) to one of a plurality of adjacent, similarly sized cells in the grid system. The cells in the grid system may be hexagonal (or a different shape). Moreover, each cell in the grid system may be further divided into similarly sized sub-cells such that the spatial coordinates may be encoded at any fixed or adaptable level of accuracy. A spatial coordinate that is mapped to a cell in the grid system may be transformed into a categorical variable corresponding to an identifier of the cell. This categorical variable may be optimal for subsequent processing by the machine learning model.

In some example embodiments, the machine learning controller may prepare hierarchical data to at least eliminate redundancies and minimize ambiguity in the hierarchical data processed by the machine learning model. For example, the hierarchical data may span over multiple columns of data, each of which corresponding to a category on a different level of the hierarchy. Encoding each column of data independently may introduce redundancies as well as ambiguities if, for example, a first subcategory of a first parent category in the hierarchy includes one or more identical values as a second subcategory of a second parent category in the hierarchy. Accordingly, the machine learning controller may prepare the hierarchical data by at least concatenating values across the multiple columns where ambiguity may be present. For example, a value from the first subcategory may be concatenated with a corresponding value from the first parent category to generate a first unique combination. Likewise, the values from the second subcategory may be concatenated with the corresponding values from the second parent category to generate a second unique combination. To avoid redundancies and the concomitant ambiguities, the machine learning controller may encode the first unique combination and the second unique combination instead of separately encoding the individual values from the first subcategory, the first parent category, the second subcategory, and the second parent category.

In some example embodiments, the machine learning controller may prepare at least some numerical data in order to optimize subsequent processing by the machine learning model. For example, the machine learning controller may prepare quantitative data by at least harmonizing different units of measurement. Alternatively and/or additionally, the machine learning controller may prepare postal codes and/or telephone numbers by at least performing one or more high level aggregations. For instance, each postal code and telephone number may include one or more alphanumerical digits that may be used to aggregate the postal code or telephone number by geographic region (e.g., country, state, city, and/or the like). Accordingly, prior to processing a postal code or a telephone number with a machine learning model, the machine learning controller may perform one or more high level aggregations to enrich the postal code or the telephone number by at least associating the postal code or the telephone number with a corresponding geographic region.

FIG. 1A depicts a system diagram illustrating a machine learning system 100, in accordance with some example embodiments. Referring to FIG. 1A, the machine learning system 100 may include a machine learning controller 110 and a client 120. As shown in FIG. 1A, the machine learning controller 110 and the client 120 may be communicatively coupled via a network 130. The client 120 may be a processor-based device including, for example, a smartphone, a tablet computer, a wearable apparatus, a virtual assistant, an Internet-of-Things (IoT) appliance, and/or the like. Meanwhile, the network 130 may be any wired and/or wireless network including, for example, a public land mobile network (PLMN), a wide area network (WAN), a local area network (LAN), a virtual local area network (VLAN), the Internet, and/or the like.

The client 120 may interact with the machine learning controller 110 to implement a first machine learning model 150 including, for example, by constructing a data processing pipeline that may be executed to generate the first machine learning model 150. As shown in FIG. 1A, the machine learning controller 110 may be associated with a user interface 140 configured to receive, from a user 125 at the client 120, one or more inputs for editing a graph representative of the data processing pipeline. In some example embodiments, the one or more inputs may edit the graph representative of the data processing pipeline to include one or more operator nodes configured to generate the first machine learning model 150.

Figure 1B:
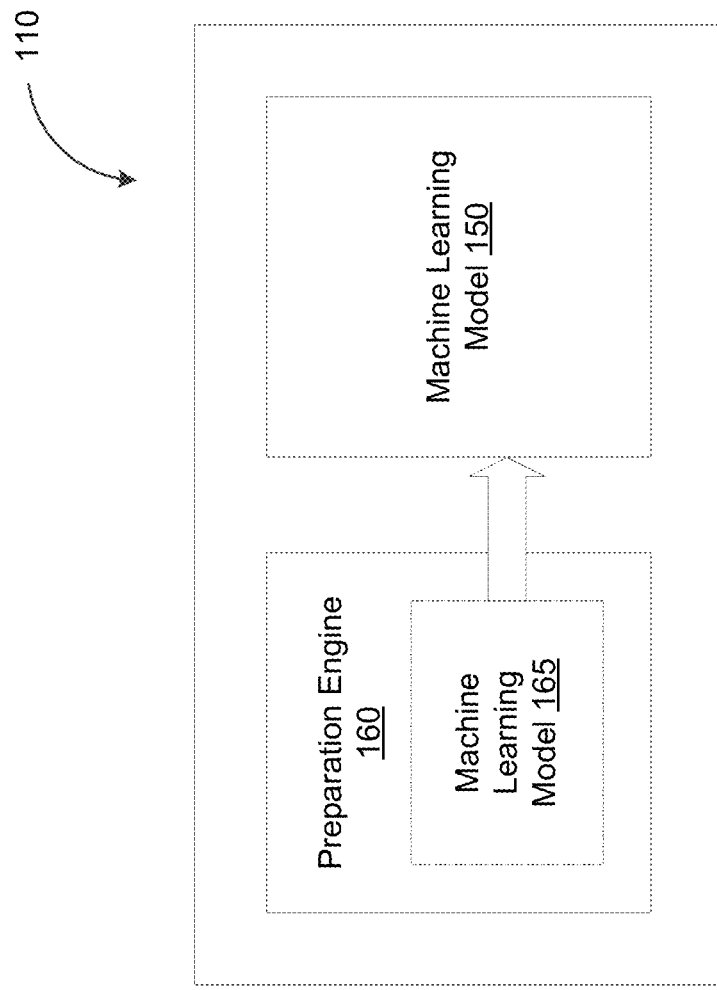
FIG. 1B depicts a block diagram illustrating an example of a machine learning controller, in accordance with some example embodiments.
Figure 1C:
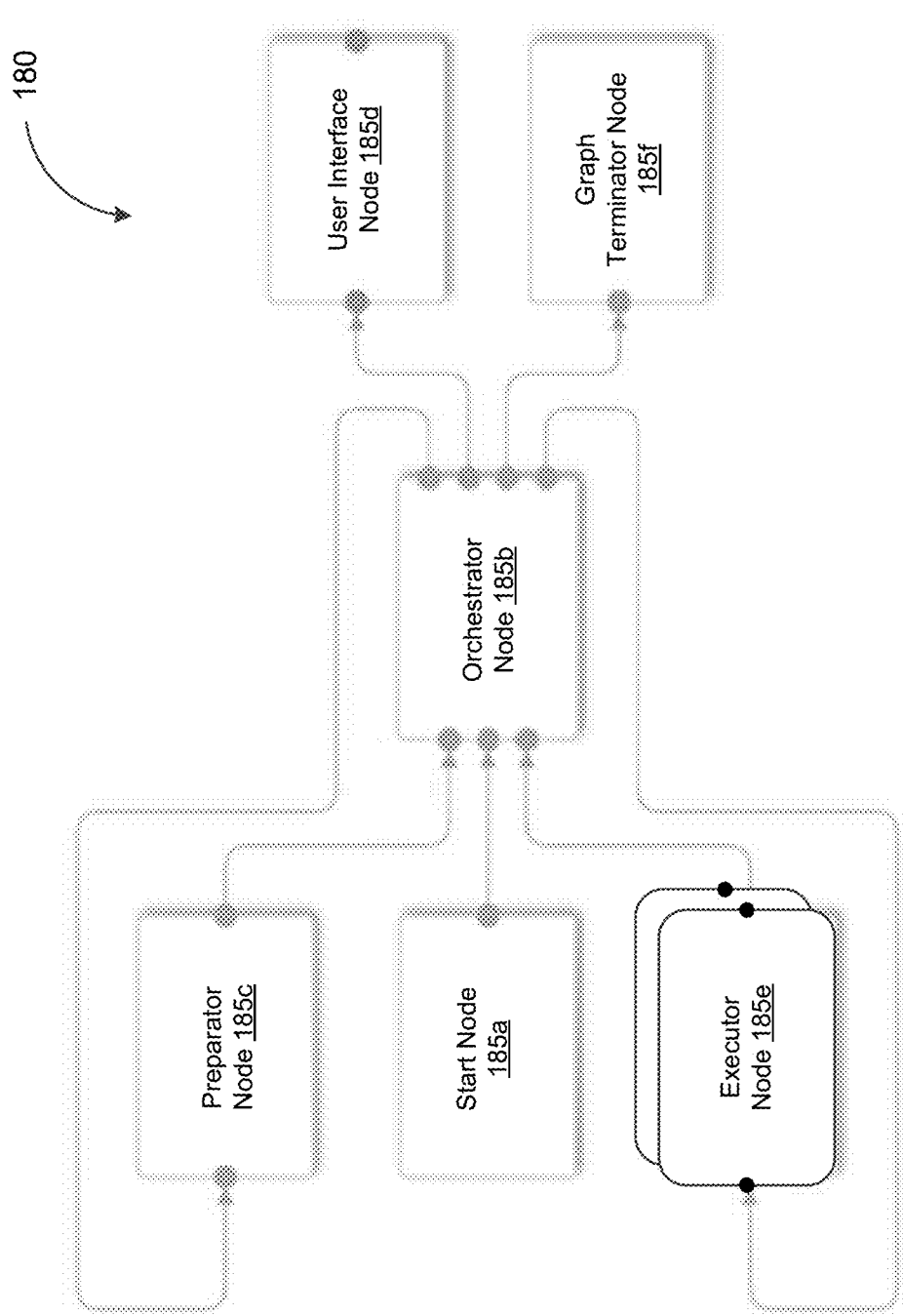
FIG. 1C depicts examples of operator nodes forming a data processing pipeline configured to generate a machine learning model, in accordance with some example embodiments.

For example, FIG. 1C depicts examples of operator nodes forming a data processing pipeline 180 configured to generate a machine learning model, in accordance with some example embodiments. As shown in FIG. 1C, the graph representative of the data processing pipeline 180 may be edited to include a start node 185*a*, an orchestrator node 185*b*, a preparator node 185*c*, a user interface node 185*d*, one or more executor nodes 185*e*, and a graph terminator node 185*f*. The data processing pipeline 180 may be executed, based at least on the graph, to generate the first machine learning model 150, which may be trained to perform a cognitive task including, for example, object identification, natural language processing, information retrieval, speech recognition, classification, regression, and/or the like. For instance, the first machine learning model 150 generated by executing the data processing pipeline may be trained to classify text by at least assigning, to the text, one or more labels indicating a sentiment, a topic, and/or an intent associated with the text.

In some example embodiments, the orchestrator node may be configured to coordinate the operations of the one or more executor node. Each executor node may be configured to execute, based at least on a training dataset and a validation dataset generated by the preparator node, one or more machine learning trials. Each machine learning trial may include applying, to the training dataset and/or the validation dataset, a machine learning model having a specific set of trial parameters. The set of trial parameters may include one or more parameters of the machine learning model such as, for example, the initial weights applied by the machine learning model prior to training. Furthermore, the set of trial parameters may include one or more hyperparameters of the machine learning model including, for example, the learning rate (e.g., step size) of a neural network, the value of the constant k in a k-nearest neighbors clustering algorithm, the cost and sigma associated with a support vector machine, and/or the like.

In some example embodiments, executing the data processing pipeline to generate the first machine learning model 150 may include the one or more executor node executing a sequence of machine learning trials, each of which including a different machine learning model and/or a different set of trial parameters. For instance, an executor node in the data processing pipeline may execute a first machine learning trial by at least applying, to the training dataset and/or the validation dataset, a first machine learning model having a first set of trial parameters. Furthermore, the same executor node or a different executor node in the data processing pipeline may execute a second machine learning trial by at least applying, to the training dataset and/or the validation dataset, the first machine learning model having a second set of trial parameters or a second machine learning model having a third set of trial parameters.

Referring again to FIG. 1A, the machine learning controller 110 may include a preparation engine 160 configured to prepare data for processing by the first machine learning model 150. For example, the preparation engine 160 may prepare numerical data as well as textual data for processing by the first machine learning model 150 including by embedding and/or encoding data to at least optimize processing by the first machine learning model 150. The preparation engine 160 may prepare any type of data processing by the first machine learning model 150 including, for example, training data, validation data, test data, production data, and/or the like.

FIG. 1B depicts a block diagram illustrating an example of the machine learning controller 110, in accordance with some example embodiments. Referring to FIGS. 1A-B, the preparation engine 160 may include a second machine learning model 165 configured to embed data for processing by the first machine learning model 150. In some example embodiments, the first machine learning model 150 may be a traditional machine learning model. As used herein, a "traditional machine learning model" may refer to a non-neural network based machine learning model. Examples of traditional machine learning models may include linear models (e.g., linear regression model, lasso regression model, ridge regression model, ElasticNet, passive aggressive model, and/or the like), decision trees (e.g., C4.5, CART, CHAID, and/or the like), ensemble methods (e.g., random forest, XGBoost, CatBoost, AdaBoost, LightGBM, and/or the like), support vector machines (e.g., linear support vector machine, nu-support vector classification SVC, support vector regression, and/or the like), and Bayesian models (e.g., association rules, majority voter, naïve Bayes, and/or the like). Contrastingly, the second machine learning model 165 may be a deep machine learning model based on artificial neural networks. For example, the second machine learning model 165 may be a deep neural network, a deep belief network, a recurrent neural network, or a convolutional neural network.

In some example embodiments, the preparation engine 160 may apply the second machine learning model 165 in order to embed textual data for processing by the first machine learning model 150. The second machine learning model 165 may be trained to embed textual data including by generating one or more corresponding numerical vectors. It should be appreciated that textual data may be high dimensional data with a tendency to cause overfitting, a phenomenon in which the second machine learning model 165 generates erroneous outputs because the second machine learning model 165 is trained to adhere too closely to the noise present in the training data. To optimize the second machine learning model 165 for high dimensional textual data, the preparation engine 160 or the second machine learning model 165 may apply one or more countermeasures to avoid the curse of dimensionality including, for example, regularization, cross validation (e.g., with independent validation datasets), and/or the like.

Being a neural network-based deep machine learning model, the second machine learning model 165 may embed textual data while preserving the context present in the textual data. As such, the results of applying the first machine learning model 150, which is a traditional machine learning model, to the textual data embedded by the second machine learning model 165 may be more robust and accurate. Accordingly, the combination of the second machine learning model 165 for embedding textual data and the first machine learning model 150 for processing the embedded textual data may be especially optimal for machine learning applications that require consistently accurate results with minimal training and execution time.

As noted, the first machine learning model 150 may be generated by executing a data processing pipeline including an orchestrator node, a preparator node, and one or more executor nodes. Moreover, executing the data processing pipeline to generate the first machine learning model 150 may include the one or more executor node executing a sequence of machine learning trials, each of which including a different machine learning model and/or a different set of trial parameters. According to some example embodiments, in order to avoid embedding the same textual data repeatedly for each machine learning trial, the preparation engine 160 may be configured to store, at a cache 170, embedded textual data. Each machine learning trial may therefore be executed based on the embedded textual data stored in the cache 170. For example, an executor node in the data processing pipeline may execute a first machine learning trial by at least applying, to the embedded textual data in the cache 170, a first machine learning model having a first set of trial parameters. Furthermore, the same executor node or a different executor node in the data processing pipeline may execute a second machine learning trial by at least applying, to the same embedded textual data in the cache 170, the first machine learning model having a second set of trial parameters or a second machine learning model having a third set of trial parameters.

Figure 2:
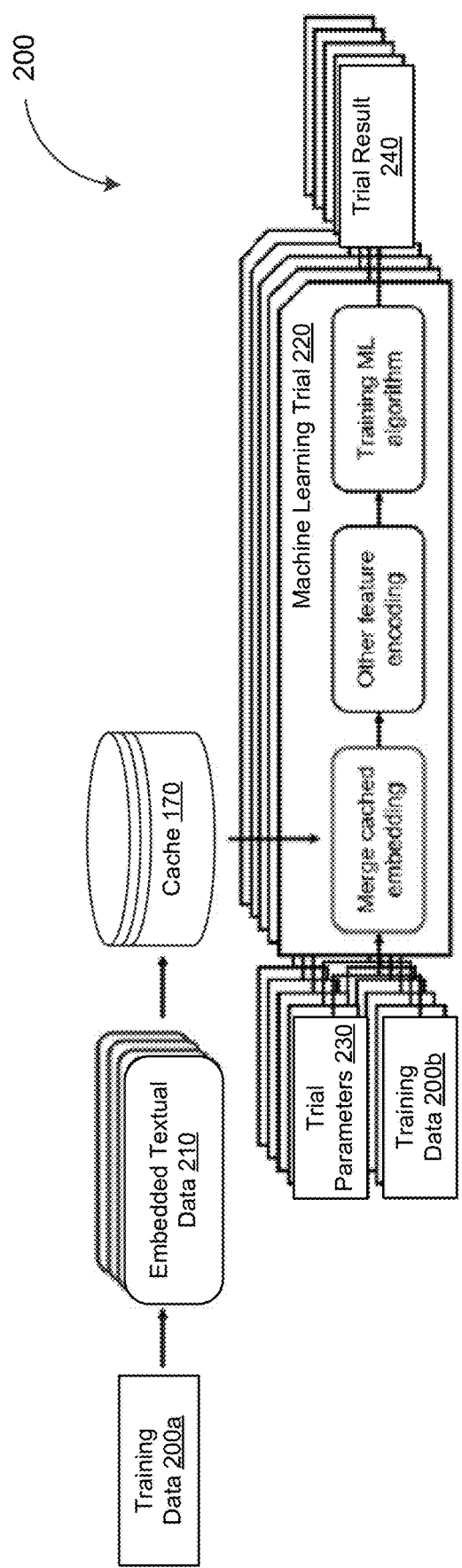
FIG. 2 depicts a block diagram illustrating an example data flow associated with executing multiple machine learning trials, in accordance with some example embodiments.

To further illustrate, FIG. 2 depicts a block diagram illustrating an example data flow associated with executing multiple machine learning trials, in accordance with some example embodiments. In some example embodiments, the preparation engine 160 may embed a first training data 200a to generate an embedded textual data 210 including by applying, to the first training data 200a, the second machine learning model 165. The embedded textual data 210 may be stored in the cache 170, where the embedded textual data 210 may be accessed for executing one or more machine learning trials to generate, for example, the first machine learning model 150. For example, FIG. 2 shows that a machine learning trial 220 having one or more trial parameters 230 may be executed, based on the embedded textual data 210 from the cache 170, to generate a trial result 240. Furthermore, FIG. 2 shows that the execution of the machine learning trial 220 may include merging the embedded textual data 210 from the cache 170 with a second training data 200b and performing additional feature encoding before applying a machine learning model to the embedded and encoded textual data.

Referring again to FIG. 1A, the preparation engine 160 may prepare numerical data as well as textual data for processing by the first machine learning model 150 including by embedding and/or encoding data to at least optimize processing by the first machine learning model 150. In some example embodiments, the preparation engine 160 may prepare spatial data for processing by the first machine learning model 150. Spatial data may include spatial coordinates, each of which including one or more values (e.g. a longitudinal value and a latitudinal value) identifying a geographical location. The preparation engine 160 may therefore prepare the spatial data by at least encoding, based at least on a grid system, the spatial data. For example, the spatial data may be encoded by at least mapping each spatial coordinate (e.g. pair of longitudinal value and latitudinal value) to one of a plurality of adjacent, similarly sized cells in the grid system. The cells in the grid system may be hexagonal (or a different shape). Moreover, each cell in the grid system may be further divided into additional sub-cells such that the spatial coordinates may be encoded at any fixed or adaptable level of accuracy. A spatial coordinate that is mapped to a cell in the grid system may be transformed into a categorical variable corresponding to an identifier of the cell. This categorical variable may be optimal for subsequent processing by, for example, the first machine learning model 150.

Figure 3A:
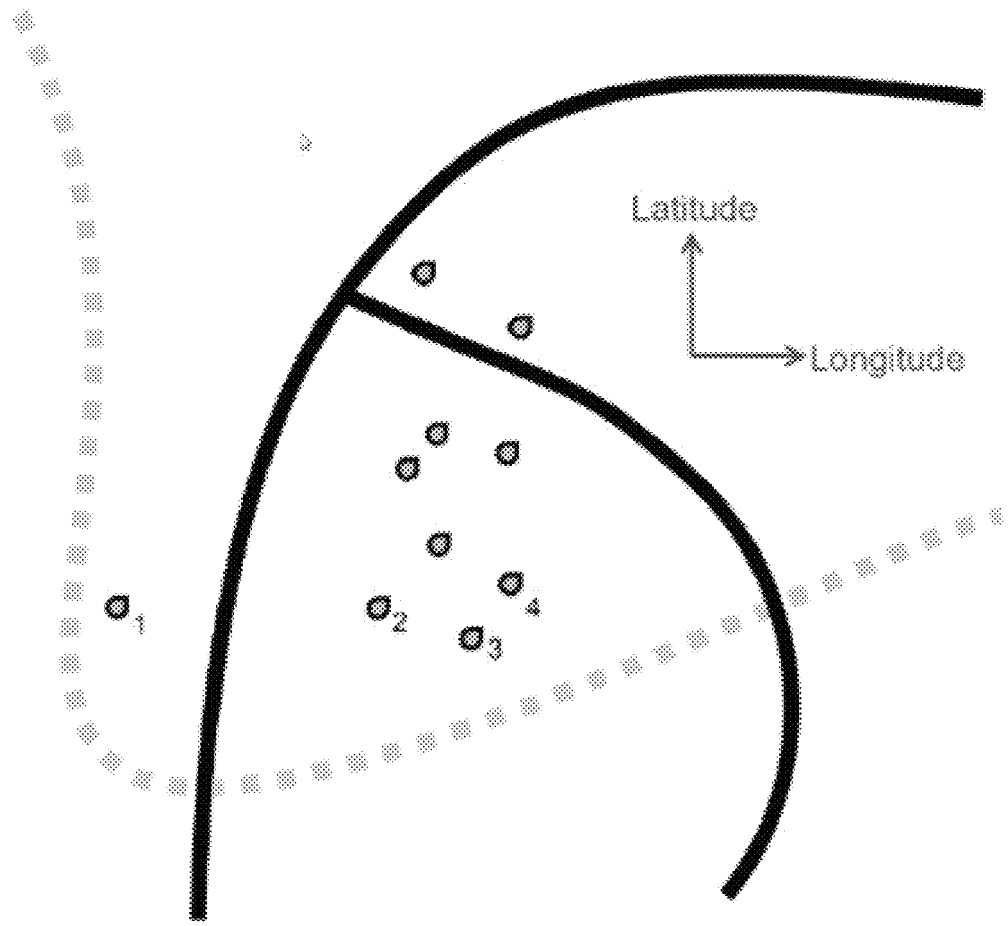
FIG. 3A depicts an example of spatial data, in accordance with some example embodiments.

To further illustrate, FIG. 3A depicts an example of spatial data, in accordance with some example embodiments. Referring to FIG. 3A, the spatial data may include multiple spatial coordinates, which are further depicted in Table 1 below. As shown in Table 1, each of spatial coordinate shown in FIG. 3A may be associated with an identifier. Moreover, in the example coordinate system shown in FIG. 3A, each spatial coordinate may include a longitudinal value and a latitudinal value. For example, a first spatial coordinate may be associated with an identifier "1", a latitudinal value of "49.5", and a longitudinal value of "8.4". Alternatively and/or additionally, a second spatial coordinate may be associated with an identifier "2", a latitudinal value of "49.5", and a longitudinal value of "8.5". A third spatial coordinate may be associated with an identifier "3", a latitudinal value of "49.3", and a longitudinal value of "8.6". Furthermore, a fourth spatial coordinate may be associated with an identifier "4", a latitudinal value of "49.8", and a longitudinal value of "8.7".

TABLE 1

| ID | Latitude | Longitude | Level 1 | Level 2 |
|----|----------|-----------|---------|---------|
| 1  | 49.5     | 8.4       | A5      | A56     |
| 2  | 49.5     | 8.5       | B4      | B45     |
| 3  | 49.3     | 8.6       | B4      | B44     |
| 4  | 49.8     | 8.7       | B4      | B43     |
| .  | .        | .         | .       | .       |
| .  | .        | .         | .       | .       |
| .  | .        | .         | .       | .       |

Figure 3B:
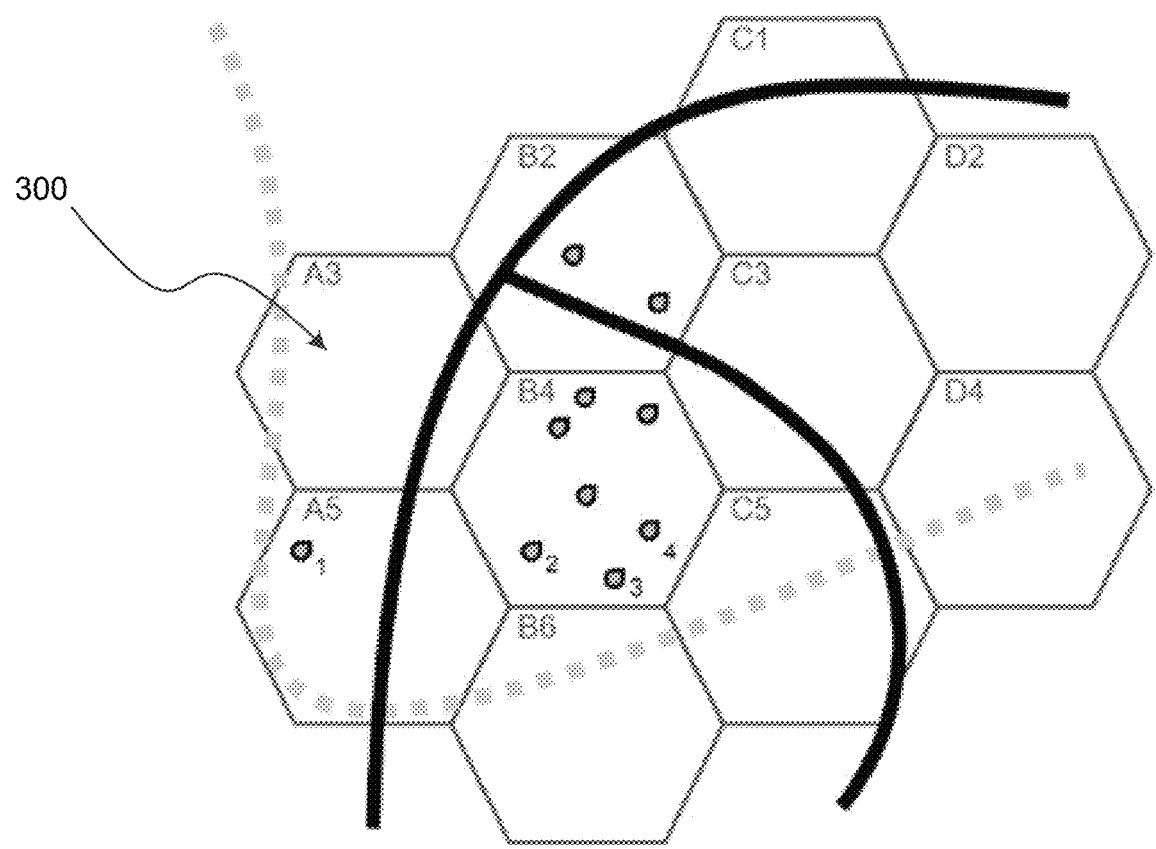
FIG. 3B depicts an example of encoding spatial coordinates into a grid-based hierarchical spatial index, in accordance with some example embodiments.

FIG. 3B depicts an example of encoding spatial coordinates into a grid-based hierarchical spatial index, in accordance with some example embodiments. As shown in FIG. 3B, the spatial coordinates depicted in FIG. 3A may be mapped to one of a plurality of adjacent, similarly sized cells in a grid system 300. In the example shown in FIG. 3B, the grid system 300 may include hexagonally shaped cells. However, it should be appreciated that the cells in the grid system 300 may take on a different shape including, for example, triangles, squares, and/or the like. Moreover, referring again to Table 1, a spatial coordinate mapped to a cell in the grid system 300 may be transformed into a categorical variable corresponding to an identifier of the cell. For example, the first spatial coordinate may be mapped to a first cell "A5" while the second spatial coordinate, the third spatial coordinate, and the fourth spatial coordinate may be mapped to a second cell "B4".

In some example embodiments, the cells in the grid system 300 may be further divided into adjacent, similarly sized sub-cells when more than a threshold quantity of spatial coordinates cluster in a single cell. This subdivision may be fixed or performed in response to the clustering of more than the threshold quantity of spatial coordinates in a single cell. Accordingly, the preparation engine 160 may encode spatial coordinates at any fixed or adaptable level of accuracy. To further illustrate, FIG. 3C depicts another example of encoding spatial coordinates into a grid-based hierarchical spatial index, in accordance with some example embodiments.

Figure 3C:
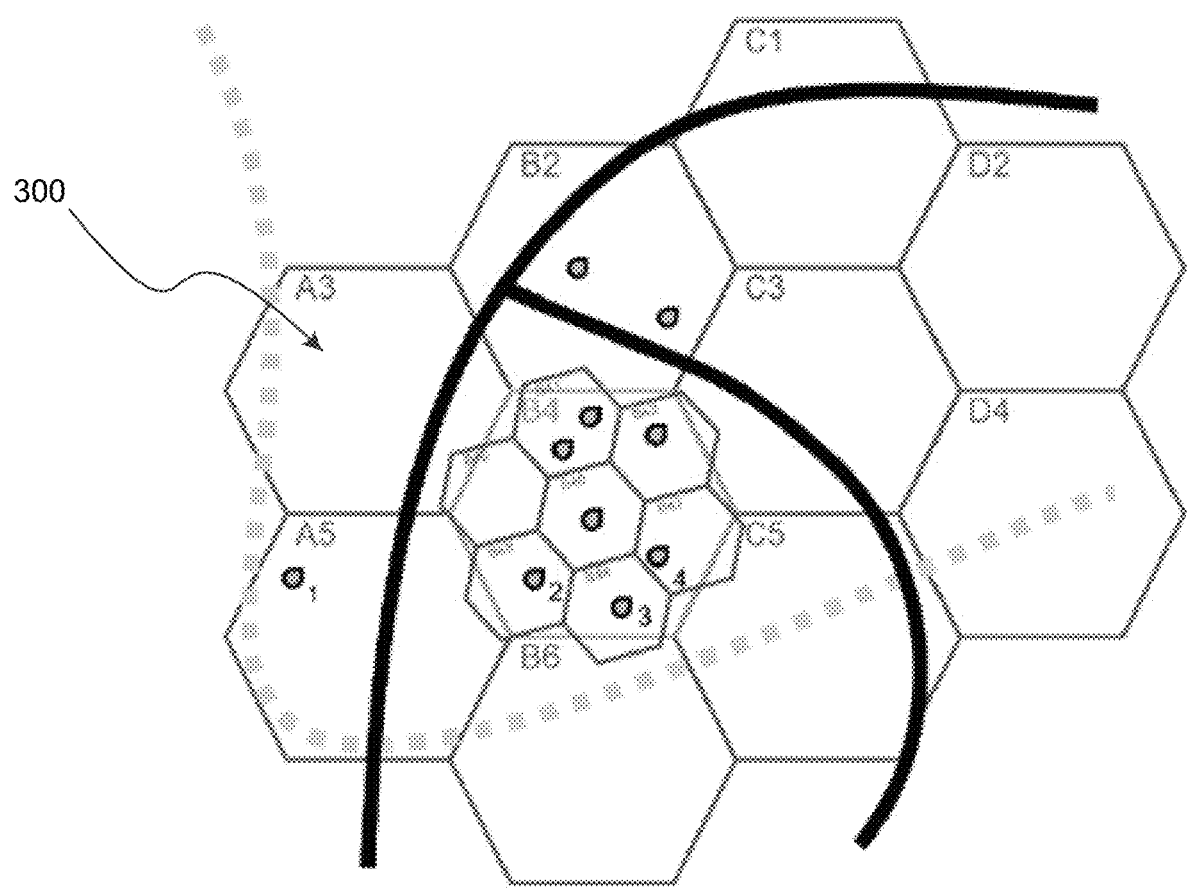
FIG. 3C depicts another example of encoding spatial coordinates into a grid-based hierarchical spatial index, in accordance with some example embodiments.

In the example shown in FIG. 3C, a single cell in the grid system 300 may be further divided into multiple adjacent, similarly sized sub-cells. For example, the second cell "B4" may be subdivided into a first sub-cell "B40", a second sub-cell "B41", a third sub-cell "B42", a fourth sub-cell "B43", a fifth sub-cell "B44", and a sixth sub-cell "B45". According to some example embodiments, the sub-division of the grid system 300 may be fixed such that the grid system 300 may not be subject to further sub-division when more than a threshold quantity of spatial coordinates cluster in a single cell (or sub-cell). Alternatively, the cells of the grid system 300 may be subject to further sub-division whenever more than a threshold quantity of spatial coordinates cluster in a single cell (or sub-cell). For instance, the second cell "B4" may be further sub-divided in response to the second spatial coordinate, the third spatial coordinate, and the fourth spatial coordinate clustering within the second cell "B4". By sub-dividing the second cell "B4", the second spatial coordinate, the third spatial coordinate, and the fourth spatial coordinate may be further mapped to a sub-cell within the second cell "B4". As shown in Table 1, for example, the second spatial coordinate may be mapped to the sixth sub-cell "B45", the third spatial coordinate may be mapped to the fifth sub-cell "B44," and the fourth spatial coordinate may be mapped to the fourth sub-cell "B43."

According to some example embodiments, mapping a spatial coordinate to a cell (or sub-cell) in the grid system 300 may be transform the spatial coordinate into a categorical variable corresponding to an identifier of the cell (or sub-cell). This categorical variable may be optimal for subsequent processing by, for example, the first machine learning model 150. For example, as shown in Table 1, mapping the first spatial coordinate to the first cell "A4" (and/or a seventh sub-cell "A56") may transform the first spatial coordinate into a categorical variable corresponding to the identifier "A4" (and/or "A56") such that the first spatial coordinate is represented as the identifier "A4" (and/or "A56") instead of the latitudinal value of "49.5" and the longitudinal value of "8.4" when undergoing processing by the first machine learning model 150. Likewise, mapping the second spatial coordinate to the second cell "B4" (and/or the sixth sub-cell "B45") transform the second spatial coordinate into a categorical variable corresponding to the identifier "B4" (and/or "B45") such that the second spatial coordinate is represented as the identifier "B4" (and/or "B45") instead of the latitudinal value of "49.5" and the longitudinal value of "8.5" when undergoing processing by the first machine learning model.

In some example embodiments, the preparation engine 160 may further prepare data for processing by the first machine learning model 150 by at least preparing hierarchical data to at least eliminate redundancies and minimize ambiguity. To further illustrate, FIG. 3D below depicts an example of hierarchical data, in accordance with some example embodiments. The hierarchical data shown in FIG. 3D may further correspond to the data depicted in Table 2 below.

TABLE 2

| ID | Level 1 | Level 2 |
|---|---|---|
| 1 | America | North |
| 2 | America | South |
| 3 | Europe | South |
| 4 | Asia | East |
| . | . | . |
| . | . | . |
| . | . | . |

Figure 3D:
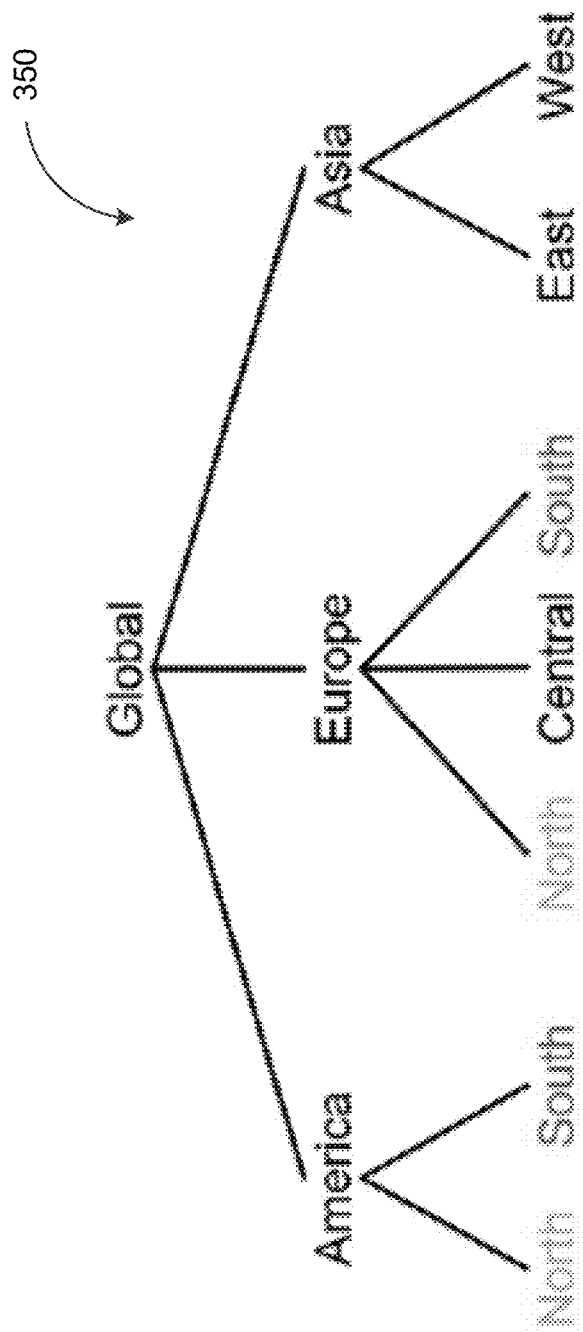
FIG. 3D depicts an example of hierarchical data, in accordance with some example embodiments.

Referring to FIG. 3D, each column of data included in Table 2 may correspond to category occupying a different level of a hierarchy 350 formed by the hierarchical data. For example, the values "America", "Europe", and "Asia" from a first column of Table 2 may occupy a first level in the hierarchy 350 while the values "North", "South," and "East" from a second column of Table 2 may occupy a second level of the hierarchy 350. Moreover, each value in the first column of Table 2 may correspond to a parent category while each value in the second column of Table 2 may correspond to a child category. Ambiguities may arise due to redundant values in the parent category and/or the child category such that encoding each column of data from Table 2 independently may introduce errors in the outputs of the first machine learning model 150 operating on the encoded hierarchical data.

For example, the value "America" in the first column of Table 2 and the value "South" in the second column of Table 2 are redundant and therefore ambiguous if encoded as independent values. Accordingly, in some example embodiments, the preparation engine 160 may prepare the hierarchical data by at least concatenating corresponding values from at least the first column and second column of Table 2. For instance, concatenating the value "America" from the first column of Table 2 with the value "North" and the value "South" from the second column of Table 2 may resolve the ambiguity arising from multiple occurrences of the value "America" in the first column of Table 2. Likewise, concatenating the value "South" from the second column of Table 2 with the value "America" and the value "Europe" from the first column of Table 2 may further resolve the ambiguity arising from multiple occurrences of the value "South" in the second column of Table 2. It should be appreciated that concatenating values from across multiple levels of the hierarchical data may form unique combinations, which may be more optimal for subsequent processing by the first machine learning model 150.

In some example embodiments, the preparation engine 160 may prepare at least some numerical data in order to optimize subsequent processing by the first machine learning model 150. For example, the preparation engine 160 may prepare quantitative data by at least harmonizing different units of measurement. To further illustrate, Table 3 below depicts quantitative data in which volumetric information is expressed using different units of measurement. This inconsistency in the units of measurement may reduce the accuracy of the first machine learning model 150 operating on the quantitative data.

TABLE 3

| ID | Volume | Unit |
|---|---|---|
| 1 | 5.000 | liter |
| 2 | 0.002 | cubic meter |
| 3 | 8.000 | deciliter |
| 4 | 1.320 | gallon |
| . | . | . |
| . | . | . |
| . | . | . |

In some example embodiments, the preparation engine 160 may prepare quantitative data expressed in different units of measurements by at least converting the quantitative data to a single unit of measurement selected, for example, by the user 125 at the client 120. For example, Table 4 below depicts quantitative data in which the volumetric information from Table 3 have been converted to a single unit of measurement (e.g., cubic decimeters). The quantitative data shown in Table 4 may be optimized for subsequent processing by the first machine learning model 150.

TABLE 4

| ID | Volume |
|---|---|
| 1 | 5.000 |
| 2 | 2.000 |
| 3 | 0.800 |
| 4 | 5.000 |
| . | . |
| . | . |
| . | . |

Alternatively and/or additionally, the preparation engine 160 may prepare postal codes and/or telephone numbers by at least performing one or more high level aggregations. Each postal code and telephone number may include one or more alphanumerical digits that may be used to aggregate the postal code or telephone number by geographic region (e.g., country, state, city, and/or the like). For example, the first three digits of a telephone number may indicate a country associated with the telephone number while the next three digits of the telephone number may indicate an area associated with the telephone number. Alternatively and/or additionally, the first digit of a zip code may indicate a group of states while the next two digits of the zip code may indicate a region within the group of states. Accordingly, prior to processing a postal code or a telephone number with the first machine learning model 150, the preparation engine 160 may perform one or more high level aggregations to enrich the postal code or the telephone number by at least associated with the postal code or the telephone number with a corresponding geographic region.

Figure 4A:
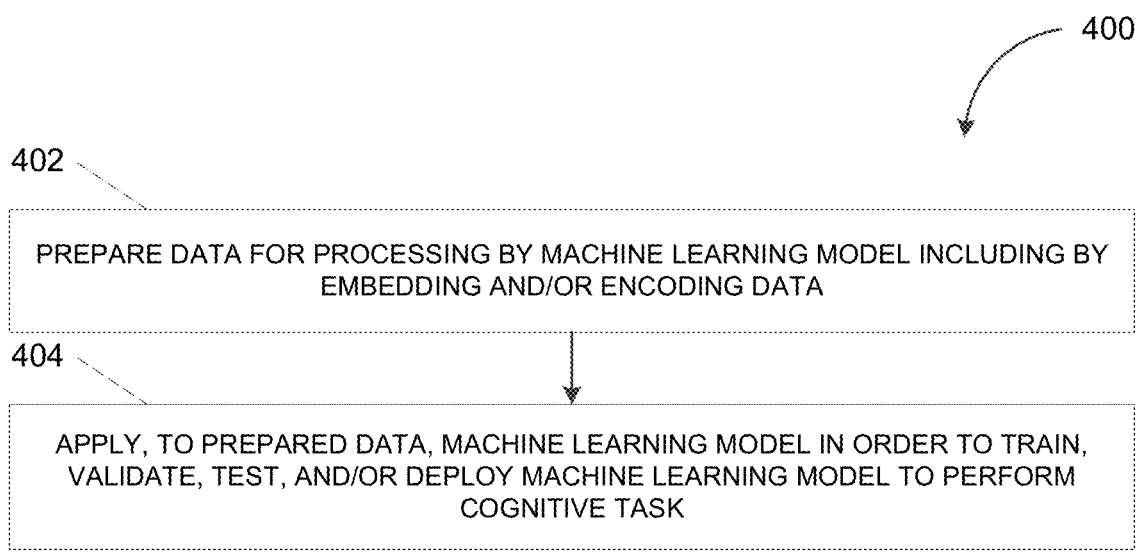
FIG. 4A depicts a flowchart illustrating an example of a process for machine learning processing, in accordance with some example embodiments.

FIG. 4A depicts a flowchart illustrating a process 400 for machine learning processing, in accordance with some example embodiments. Referring to FIGS. 1A-B, 2, 3A-D, and 4A, the process 400 may be performed by the machine learning controller 110 in order to apply the first machine learning model 150 to data including, for example, training data, validation data, test data, production data, and/or the like.

At 402, the machine learning controller 110 may prepare data for processing by a machine learning model including by embedding and/or encoding the data. In some example embodiments, the machine learning controller 110, for example, the preparation engine 160 may prepare numerical data and/or textual data for processing by the first machine learning model 150. For example, the machine learning controller 110 may embed and/or encode the numerical data and/or the textual data to at least optimize subsequent processing by the first machine learning model 150. Moreover, the preparation engine 160 may prepare any type of data processing by the first machine learning model 150 including, for example, training data, validation data, test data, production data, and/or the like.

At 404, the machine learning controller 110 may apply, to the prepared data, the machine learning model in order to train, validate, test, and/or deploy machine learning model to perform a cognitive task. For example, the machine learning controller 110 may apply the first machine learning model 150 to the numerical data and/or the textual data prepared by the machine learning controller 110 as part of training, validating, testing, and/or deploying the first machine learning model 150. The first machine learning model 150 may operate on the prepared numerical data and/or textual data in order to perform a cognitive task including, for example, object identification, natural language processing, information retrieval, speech recognition, classification, regression, and/or the like. For instance, the first machine learning model 150 may operate on the prepared data in order to perform text classification, which may include assigning, to a text, one or more labels indicating a sentiment, a topic, and/or an intent associated with the text.

Figure 4B:
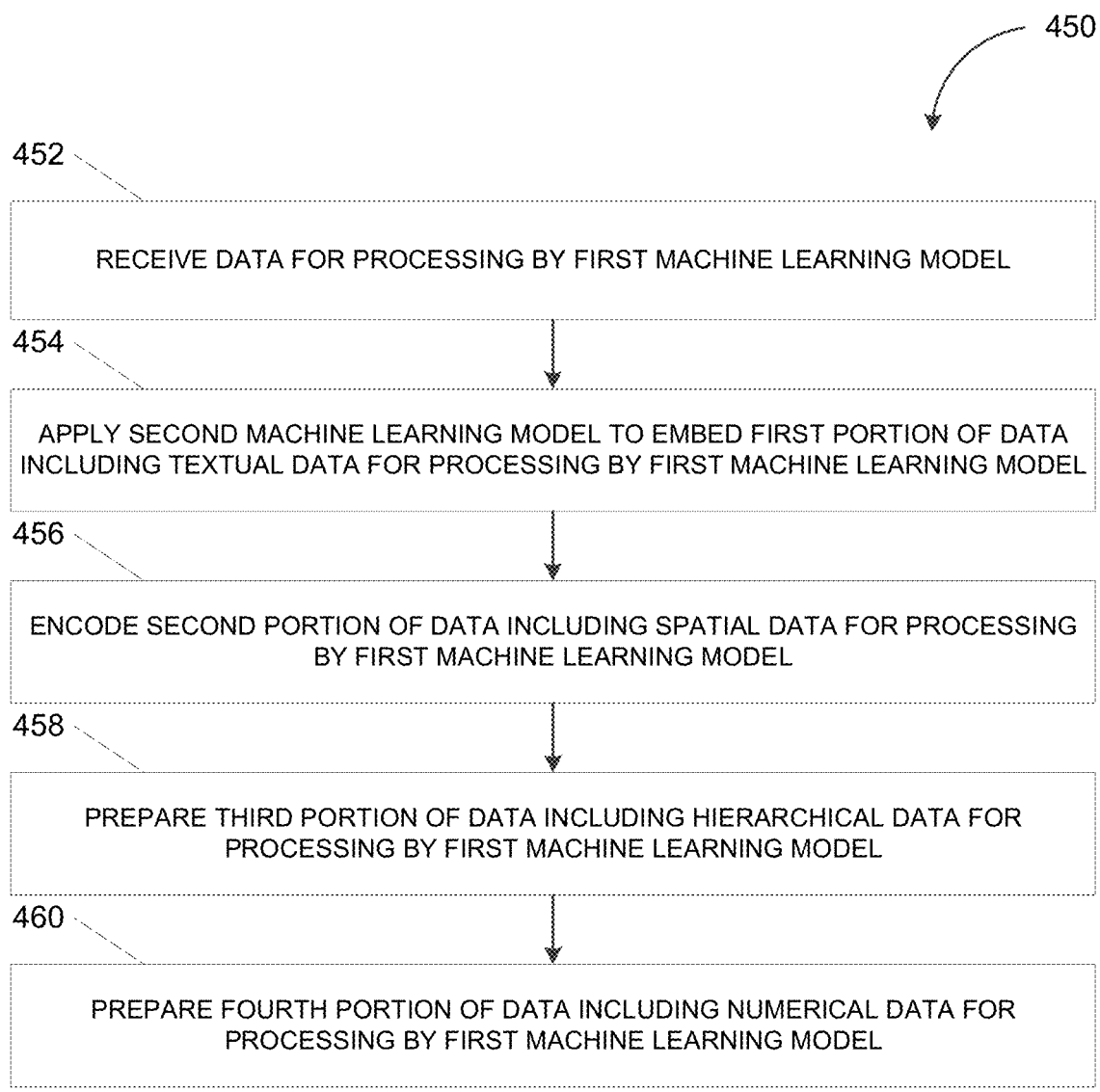
FIG. 4B depicts a flowchart illustrating an example of a process for preparing data for machine learning processing, in accordance with some example embodiments.

FIG. 4B depicts a flowchart illustrating a process 450 for preparing data for machine learning processing, in accordance with some example embodiments. Referring to FIGS. 1A-B, 2, 3A-D, and 4A-B, the process 450 may implement operation 402 of the process 400 shown in FIG. 4A. Moreover, the process 450 may be performed by the machine learning controller 110, for example, the preparation engine 160 in order to apply prepare data (e.g., training data, validation data, test data, production data, and/or the like) for processing by the first machine learning model 150.

At 452, the machine learning controller 110 may receive data for processing by a first machine learning model. For example, the machine learning controller 110, for example, the preparation engine 160 may receive training data, validation data, test data, and/or production data for processing by the first machine learning model 150. The first machine learning model 150 may process the data in order to train, validate, test, and/or deploy the first machine learning model 150 to perform a cognitive task including, for example, object identification, natural language processing, information retrieval, speech recognition, classification, regression, and/or the like.

At 454, the machine learning controller 110 may apply a second machine learning model to embed a first portion of data including textual data for processing by the first machine learning model. In some example embodiments, the machine learning controller 110 may apply the second machine learning model 165 in order to embed textual data for processing by the first machine learning model 150. The second machine learning model 165 may be a deep machine learning model trained to embed textual data for processing by the first machine learning model 150, which may be a traditional, non-neural network based machine learning model. For instance, the first machine learning model 150 may be a linear model, a decision tree, an ensemble method, a support vector machine, and/or a Bayesian model while the second machine learning model 165 may be a deep neural network, a deep belief network, a recurrent neural network, and/or a convolutional neural network.

Being a neural network-based deep machine learning model, the second machine learning model 165 may embed textual data while preserving the context present in the textual data. As such, the results of applying the first machine learning model 150, which is a traditional machine learning model, to the textual data embedded by the second machine learning model 165 may be more robust and accurate. Accordingly, the combination of the second machine learning model 165 for embedding textual data and the first machine learning model 150 for processing the embedded textual data may be especially optimal for machine learning applications that require consistently accurate results with minimal training and execution time.

At 456, the machine learning controller 110 may encode a second portion of data including spatial data for processing by the first machine learning model. In some example embodiments, the machine learning controller 110 may encode spatial data for processing by the first machine learning model 150 including by mapping each spatial coordinate included in the spatial data to one of a plurality of adjacent, similarly sized cells (or sub-cell) in the grid system 300. For example, each spatial coordinate may include a longitudinal value and a latitudinal value. Mapping a spatial coordinate to a cell in the grid system 300 may transform the spatial coordinate into a categorical variable corresponding to an identifier of the cell (or sub-cell). As such, the spatial data that is processed by the first machine learning model 150 may include spatial coordinates represented by categorical variables instead of pairs of longitudinal values and latitudinal values. These categorical variables may be optimal for subsequent processing by the first machine learning model 150.

At 458, the machine learning controller 110 may prepare a third portion of data including hierarchical data for processing by the first machine learning model. In some example embodiments, the machine learning controller 110 may prepare hierarchical data to at least eliminate redundancies and minimize ambiguity in the hierarchical data processed by the first machine learning model 150. Ambiguities may arise when one or more levels of the hierarchy include redundant occurrences of a same value. For example, the value "America" in the first column of Table 2 and the value "South" in the second column of Table 2 are redundant and therefore ambiguous if encoded as independent values. Accordingly, in some example embodiments, the machine learning controller 110 may prepare the hierarchical data by at least concatenating corresponding values from at least the first column and second column of Table 2.

For instance, concatenating the value "America" from the first column of Table 2 with the value "North" and the value "South" from the second column of Table 2 may resolve the ambiguity arising from multiple occurrences of the value "America" in the first column of Table 2. Likewise, concatenating the value "South" from the second column of Table 2 with the value "America" and the value "Europe" from the first column of Table 2 may further resolve the ambiguity arising from multiple occurrences of the value "South" in the second column of Table 2. As noted, concatenating values from across multiple levels of the hierarchical data may form unique combinations, which may be more optimal for subsequent processing by the first machine learning model 150.

At 460, the machine learning controller 110 may prepare a fourth portion of data including numerical data for processing by the first machine learning model. In some example embodiments, the machine learning controller 110 may prepare quantitative data by at least converting, to a single unit of measurement, quantitative data expressed using multiple units of measurement. Alternatively and/or additionally, the machine learning controller 110 may prepare postal codes and/or telephone numbers by at least performing one or more high level aggregations. For example, each postal code and telephone number may include one or more alphanumerical digits indicative of geographic region (e.g., country, state, city, and/or the like). Accordingly, prior to processing a postal code or a telephone number with the first machine learning model 150, the machine learning controller 110 may perform one or more high level aggregations to enrich the postal code or the telephone number by at least associating the postal code or the telephone number with a corresponding geographic region.

Figure 5:
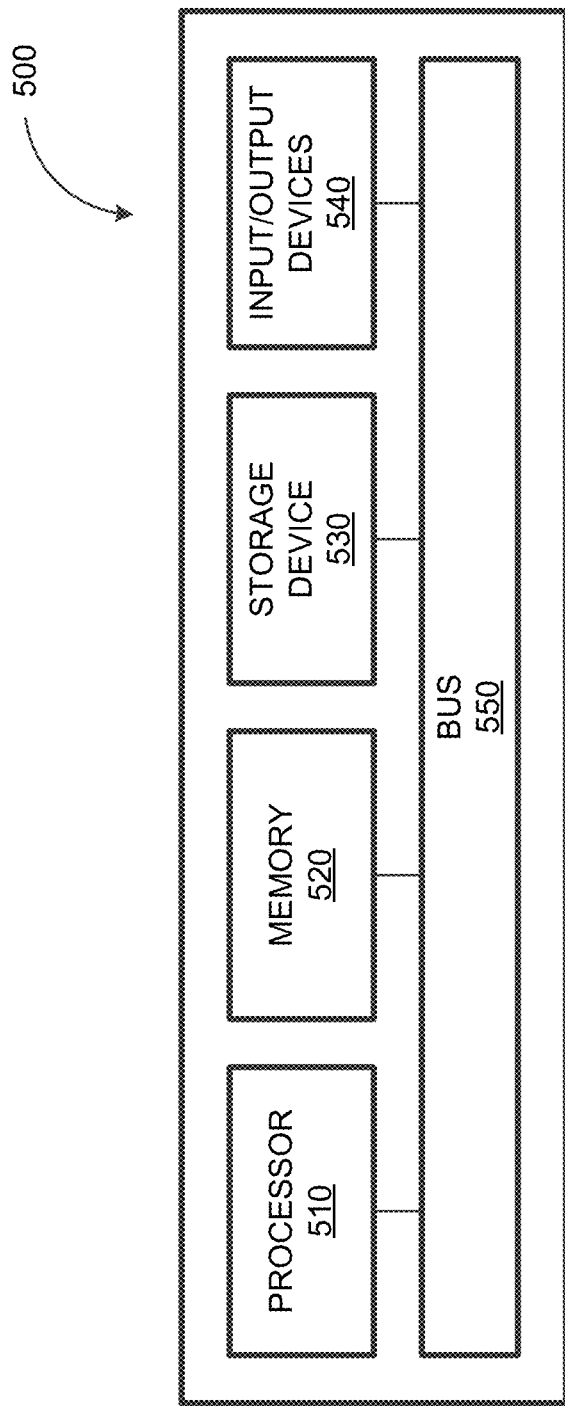
FIG. 5 depicts a block diagram illustrating a computing system, in accordance with some example embodiments.

FIG. 5 depicts a block diagram illustrating a computing system 500 consistent with implementations of the current subject matter. Referring to FIGS. 1 and 5, the computing system 500 can be used to implement the machine learning controller 110 and/or any components therein.

As shown in FIG. 5, the computing system 500 can include a processor 510, a memory 520, a storage device 530, and input/output devices 540. The processor 510, the memory 520, the storage device 530, and the input/output devices 540 can be interconnected via a system bus 550. The processor 510 is capable of processing instructions for execution within the computing system 500. Such executed instructions can implement one or more components of, for example, the machine learning controller 110. In some example embodiments, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a solid state drive, a floppy disk device, a hard disk device, an optical disk device, or a tape device, or other suitable persistent storage means. The input/output device 540 provides input/output operations for the computing system 500. In some example embodiments, the input/output device 540 includes a keyboard and/or pointing device. In various implementations, the input/output device 540 includes a display unit for displaying graphical user interfaces.

According to some example embodiments, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some example embodiments, the computing system 500 can be used to execute various interactive computer software applications that can be used for organization, analysis and/or storage of data in various formats. Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning as an add-in for a spreadsheet and/or other type of program) or can be standalone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random query memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system, comprising:
    at least one data processor; and
    at least one memory storing instructions which, when executed by the at least one data processor, result in operations comprising:
        preparing data for processing by a first machine learning model by at least embedding a second portion of the data including a textual data, the textual data being embedded by at least applying a second machine learning model trained to embed the textual data;
        preparing the data for processing by the first machine learning model, the data being prepared by at least encoding a first portion of the data including a spatial data, the spatial data including a first spatial coordinate including one or more values identifying a geographical location, wherein the encoding of the first portion of the data includes mapping, to a first cell in a grid system, the first spatial coordinate such that the first spatial coordinate is represented by a first identifier of the first cell instead of the one or more values;
        executing, based on the embedded textual data, a plurality of machine learning trials, each of the plurality of machine learning trials being executed by at least retrieving, from a cache, the embedded textual data, wherein each of the plurality of machine learning trials includes a different machine learning model and/or a different set of trial parameters, and wherein the first machine learning model is selected based at least on a result of the plurality of machine learning models; and
        applying, to the prepared data, the first machine learning model.

2. The system of claim 1, wherein the encoding of the first portion of the data further includes mapping, to the first cell or a second cell in the grid system, a second spatial coordinate included in the spatial data.

3. The system of claim 1, further comprising:
    dividing, into a first sub-cell and a second sub-cell, the first cell; and
    encoding the spatial data by at least mapping the first spatial coordinate to the first sub-cell and a second spatial coordinate to the second sub-cell such that the first spatial coordinate is represented by a second identifier of the first sub-cell and the second spatial coordinate is represented by a third identifier of the second sub-cell.

4. The system of claim 3, wherein the first cell is divided in response to more than a threshold quantity of spatial coordinates being mapped to the first cell.

5. The system of claim 1, wherein the first machine learning model comprises a non-neural network based machine learning model including a linear model, a decision tree, an ensemble method, a support vector machine, and/or a Bayesian model, and wherein the second machine learning model comprises a deep machine learning model including a deep neural network, a deep belief network, a recurrent neural network, and/or a convolutional neural network.

6. The system of claim 1, further comprising:
storing, in the cache, the embedded textual data.

7. The system of claim 1, further comprising:
preparing the data for processing by the first machine learning model by at least preparing a hierarchical data portion of the data, the hierarchical data including a first column of data corresponding to a first level of a hierarchy and a second column of data corresponding to a second level of hierarchy, the preparing of the second portion of the data includes concatenating each value from the first column of data with a corresponding value from a second column of data.

8. The system of claim 7, wherein a first value from the first column of data is concatenated with a second value from the second column of data and a third value from the first column of data is concatenated with a fourth value from the second column of data in order to resolve an ambiguity associated with the first value being identical to the third value.

9. The system of claim 1, further comprising:
preparing the data for processing by the first machine learning model by at least preparing a second portion of the data including a numerical data.

10. The system of claim 9, wherein the numerical data includes a plurality of quantities associated with different units of measurement, and wherein the second portion of the data is prepared by at least converting the plurality of quantities to a same unit of measurement.

11. The system of claim 9, wherein the numerical data includes a plurality of zip codes and/or telephone numbers, and wherein the second portion of the data is prepared by at least associating, based on one or more digits included in each of the plurality of zip codes and/or telephone numbers, each of the plurality of zip codes and/or telephone numbers with a corresponding geographic region.

12. The system of claim 1, wherein the first machine learning model is applied to the prepared data in order to train, validate, test, and/or deploy the first machine learning model.

13. The system of claim 1, wherein the one or more values include a longitudinal value and a latitudinal value.

14. A computer-implemented method, comprising:
preparing data for processing by a first machine learning model by at least embedding a second portion of the data including a textual data, the textual data being embedded by at least applying a second machine learning model trained to embed the textual data;
preparing the data for processing by the first machine learning model, the data being prepared by at least encoding a first portion of the data including a spatial data, the spatial data including a first spatial coordinate including one or more values identifying a geographical location, wherein the encoding of the first portion of the data includes mapping, to a first cell in a grid system, the first spatial coordinate such that the first spatial coordinate is represented by a first identifier of the first cell instead of the one or more values; executing, based on the embedded textual data, a plurality of machine learning trials, each of the plurality of machine learning trials being executed by at least retrieving, from a cache, the embedded textual data, wherein each of the plurality of machine learning trials includes a different machine learning model and/or a different set of trial parameters, and wherein the first machine learning model is selected based at least on a result of the plurality of machine learning models; and
applying, to the prepared data, the first machine learning model.

15. The method of claim 14, further comprising:
in response to more than a threshold quantity of spatial coordinates being mapped to the first cell, dividing, into a first sub-cell and a second sub-cell, the first cell; and
encoding the spatial data by at least mapping the first spatial coordinate to the first sub-cell and a second spatial coordinate to the second sub-cell such that the first spatial coordinate is represented by a second identifier of the first sub-cell and the second spatial coordinate is represented by a third identifier of the second sub-cell.

16. The method of claim 14, further comprising:
the first machine learning model comprising a non-neural network based machine learning model including a linear model, a decision tree, an ensemble method, a support vector machine, and/or a Bayesian model, and the second machine learning model comprising a deep machine learning model including a deep neural network, a deep belief network, a recurrent neural network, and/or a convolutional neural network.

17. The method of claim 14, further comprising:
preparing the data for processing by the first machine learning model by at least preparing a hierarchical data portion of the data, the hierarchical data including a first column of data corresponding to a first level of a hierarchy and a second column of data corresponding to a second level of hierarchy, the preparing of the second portion of the data includes concatenating each value from the first column of data with a corresponding value from a second column of data.

18. A non-transitory computer readable medium storing instructions, which when executed by at least one data processor, result in operations comprising:
preparing data for processing by a first machine learning model by at least embedding a second portion of the data including a textual data, the textual data being embedded by at least applying a second machine learning model trained to embed the textual data;
preparing the data for processing by the first machine learning model, the data being prepared by at least encoding a first portion of the data including a spatial data, the spatial data including a first spatial coordinate including one or more values identifying a geographical location, wherein the encoding of the first portion of the data includes mapping, to a first cell in a grid system, the first spatial coordinate such that the first spatial coordinate is represented by a first identifier of the first cell instead of the one or more values;
executing, based on the embedded textual data, a plurality of machine learning trials, each of the plurality of machine learning trials being executed by at least retrieving, from a cache, the embedded textual data, wherein each of the plurality of machine learning trials includes a different machine learning model and/or a different set of trial parameters, and wherein the first machine learning model is selected based at least on a result of the plurality of machine learning models; and applying, to the prepared data, the first machine learning model.

\* \* \* \* \*